(12) United States Patent
Doerrie et al.

(10) Patent No.: US 8,256,594 B2
(45) Date of Patent: Sep. 4, 2012

(54) FREEWHEEL CAGE

(75) Inventors: Swen Doerrie, Herzogenaurach (DE); Wolfgang Fugel, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 495 days.

(21) Appl. No.: 12/541,369

(22) Filed: Aug. 14, 2009

(65) Prior Publication Data

US 2010/0038202 A1 Feb. 18, 2010

(30) Foreign Application Priority Data

Aug. 16, 2008 (DE) .......................... 10 2008 037 972

(51) Int. Cl.
*F16D 41/067* (2006.01)
(52) U.S. Cl. .............................. 192/45.006; 192/45.001
(58) Field of Classification Search .................... 192/45, 192/45.1, 107 T, 44; 188/82.84
See application file for complete search history.

(56) References Cited

U.S. PATENT DOCUMENTS

| 3,904,005 | A | * | 9/1975 | Husmann | 192/45 |
| 4,422,537 | A | * | 12/1983 | Ritter et al. | 192/45 |
| 2007/0074947 | A1 | * | 4/2007 | Straub et al. | 192/45.1 |
| 2007/0246319 | A1 | * | 10/2007 | Ploetz et al. | 192/45.1 |

FOREIGN PATENT DOCUMENTS

DE 31 51 727 A1 7/1983

* cited by examiner

*Primary Examiner* — David D Le
*Assistant Examiner* — Lillian Nguyen
(74) *Attorney, Agent, or Firm* — Lucas & Mercanti, LLP; Klaus P. Stoffel

(57) ABSTRACT

A freewheel cage, which has a basic body with two annular, substantially radially extending edge disks that are connected to one another by a plurality of axially running connecting pieces and at least one annular component for fastening the basic body to a freewheel. The connecting pieces are adjacent to one another in the circumferential direction so as to form intermediate spaces for at least partially holding clamp bodies. The annular component is formed as a separate component arranged on at least one of the edge disks. By design, the basic body for the freewheel cage is produced with reduced expenditure, and subsequently, the annular component for fastening the basic body to a freewheel can, as a separate component, be produced, and arranged on the basic body for fastening to a freewheel with likewise correspondingly reduced expenditure.

6 Claims, 5 Drawing Sheets

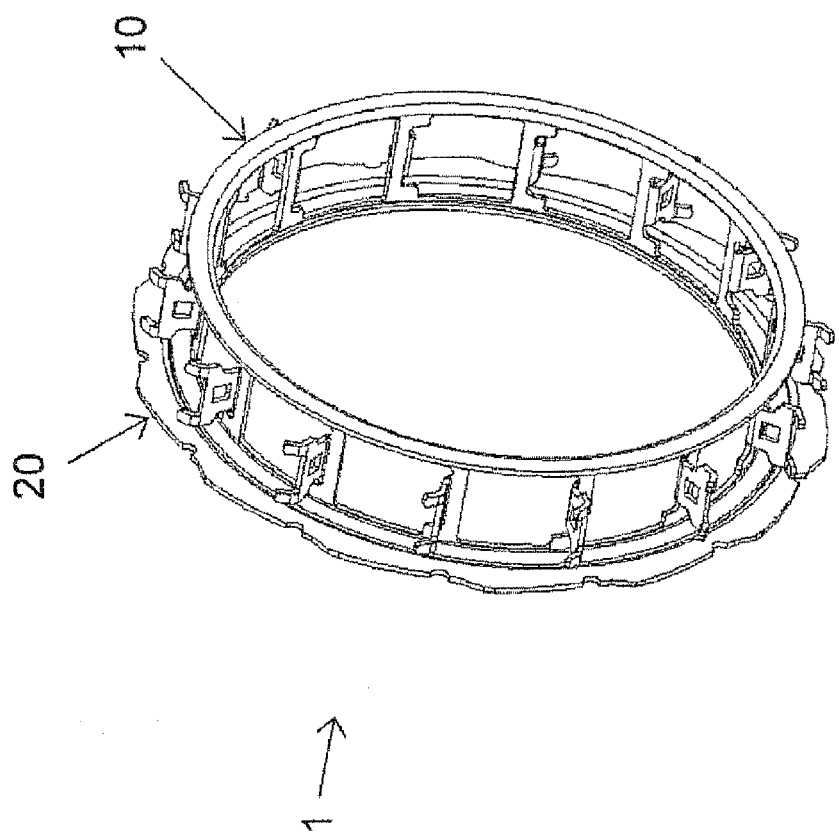

FREEWHEEL CAGE

This application claims the priority of DE 10 2008 037 972.7 filed Aug. 16, 2008 which is incorporated by reference herein.

FIELD OF THE INVENTION

The invention relates to a freewheel cage, comprising a basic body having two annular, substantially radially extending edge disks which are connected to one another by means of a plurality of axially running connecting pieces which are adjacent to one another in the circumferential direction, as a result of which intermediate spaces for at least partially holding clamp bodies are formed, and having at least one means for fastening the basic body to a freewheel.

BACKGROUND OF THE INVENTION

Freewheel cages of said type are known to the applicant, as prior art, from the applicant's own product catalog, for example for clamp body freewheels. The production of freewheel cages of said type is comparatively complex. Thus, first, the basic body is cut to length from a band of material (for example a band of sheet metal) as a material strip, and the material strip which is formed in this way is bent into a U-shape in a suitable drawing tool. Openings which are required (and which for example later partially form the intermediate spaces for holding clamp bodies) are subsequently punched out of the material, and retainers for the clamp bodies are subsequently formed by bending. In a further working step, the workpiece is then bent into the shape of a ring and joined together at its ends, for example by welding. The production of a freewheel cage of said type thus takes place in a large number of individual steps, in part using complex tools.

A freewheel cage is also known from DE 31 51 727 A1. To provide a freewheel cage which is cost-effective to produce, it is proposed in said document to form the connecting pieces (which also serve to retain the clamp bodies) as separate components.

Object of the Invention

The object on which the invention is based is that of refining a generic freewheel cage in such a way that the latter can be produced in a cost-effective manner.

SUMMARY OF THE INVENTION

The invention is based on the realization that, by means of a multi-part design of the freewheel cage, the expenditure for the production of said freewheel cage can be reduced as a result.

The invention therefore proceeds from a freewheel cage, comprising a basic body having two annular, substantially radially extending edge disks which are connected to one another by means of a plurality of axially running connecting pieces which are adjacent to one another in the circumferential direction, as a result of which intermediate spaces for at least partially holding clamp bodies are formed, and having at least one means for fastening the basic body to a freewheel. It is also provided according to the invention that said means is formed as at least one separate component, which is arranged on at least one of the edge disks.

By means of this design, it is obtained that the basic body for the freewheel cage can, first of all, be produced with reduced expenditure, and subsequently, the means for fastening the basic body to a freewheel can, as a separate component, be produced, and arranged on the basic body for fastening to a freewheel, with likewise correspondingly reduced expenditure.

The subclaims describe preferred refinements or embodiments of the invention.

It is thus provided in a first advantageous refinement of the invention that said means is formed as an annular component, which is connected to one of the edge disks.

Although it is also possible for the means to be designed in some other way (for example as a plurality of separate plate-shaped or bracket-like elements), an annular component can be produced very easily by means of a punching process and can also be connected to the basic body in a comparatively simple manner, such that the assembly of the freewheel cage is also simplified.

A second expedient embodiment of the invention provides that the annular component is connected to the end side of the edge disk. Although it would also be possible for the annular component and the edge disk to be connected to one another by means of their radial surfaces, the connection by means of the end side, however, provides larger connecting surfaces, which leads to a better connection between the annular component and the edge disk.

A further highly advantageous refinement of the invention provides that the annular component is welded, adhesively bonded, riveted or screwed to the edge disk, since said types of connection can be realized in a very simple and cost-effective manner and provide a highly reliable connection.

It is highly expedient for the annular component to have, in axial section, at least one first and one second radially aligned section, with the first section and the second section being offset axially with respect to one another. In this way, the edge disk can fit into the annular component very easily, wherein a radially aligned section may expediently be dimensioned so as to serve as a radial stop for the edge disk.

If, according to a further expedient and advantageous embodiment of the concept of the invention, the first, radially inner section is at least partially connected to the edge disk and the second, radially outer section is dimensioned so as to project at least in regions radially beyond the clamp bodies which have been placed in the basic body, the annular disk and, therefore, the basic body of the freewheel cage can be connected to the end side of the outer ring of a freewheel in an effective manner.

Here, it is quite advantageous, if the radially outer section is arranged with its axially inner end surface approximately in flush alignment with the axially inner end surface of the edge disk. In this way, it is also possible for the outer ring of the freewheel to be formed correspondingly in terms of width to the basic body of the freewheel cage.

BRIEF DESCRIPTION OF THE DRAWINGS

The invention is explained in more detail below on the basis of the appended drawing of a preferred exemplary embodiment. In the drawing:

FIG. 1 shows a perspective illustration of the basic body of the freewheel cage having connected thereto an annular component for fastening to a freewheel;

DETAILED DESCRIPTION OF THE DRAWINGS

Figure 3:
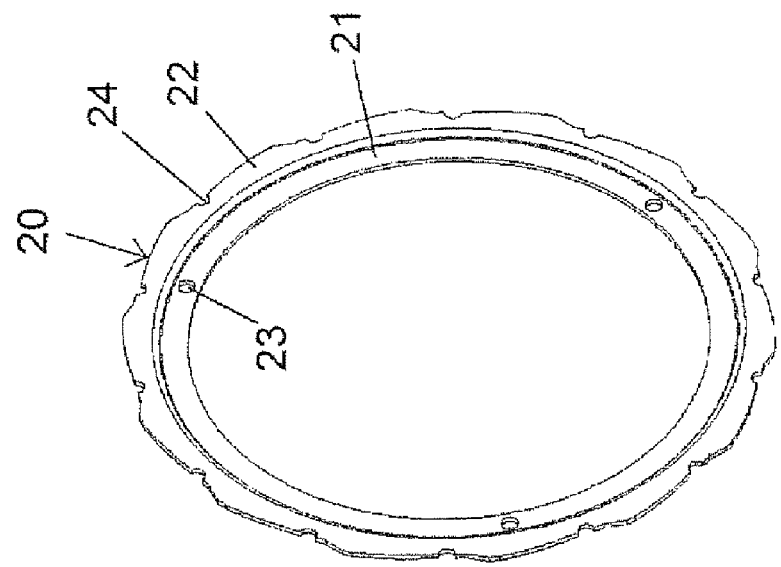
FIG. 3 shows a perspective illustration of the annular component.
Figure 2:
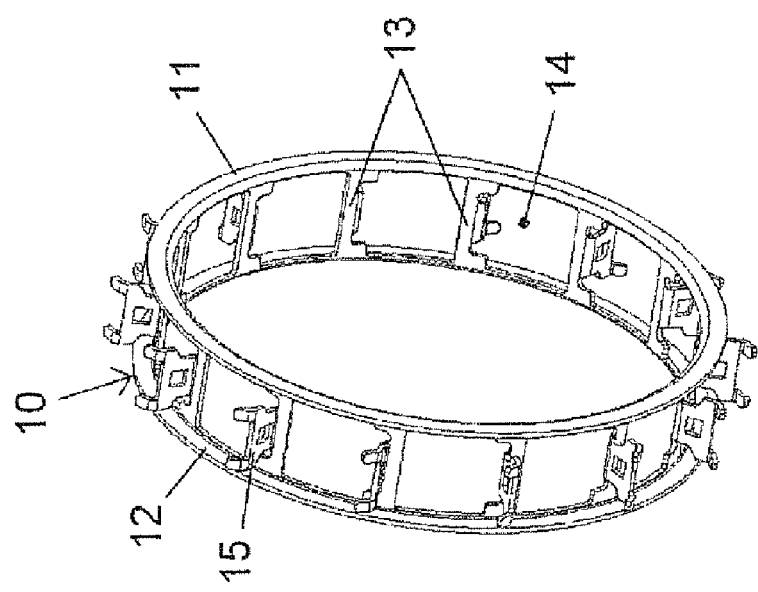
FIG. 2 shows a perspective illustration of the basic body of the freewheel cage without the annular component.

Reference is made first to FIGS. 1 to 3. Said Figures show a freewheel cage 1 according to the invention which has an annular basic body 10 with an annular component 20 attached thereto. The basic body 10 has a first edge disk 11 and a second edge disk 12 which are connected to one another by means of connecting pieces 13. The connecting pieces 13 are distributed over the circumference of the basic body 10 at uniform intervals so as to form intermediate spaces 14 between them. Also shown are retaining elements 15 which are connected to the connecting pieces 13 in a unipartite fashion and which are directed radially outward by bending.

The annular component 20 is of flat design (see also FIG. 7) and has a first radially aligned section 21 and, adjoining the latter radially, a second radially aligned section 22. The section 21 also has three openings 23 offset over the circumference at intervals of approximately 120°, and the section 22 is provided with radially outwardly open recesses 24 distributed uniformly over the circumference.

Figures 4, 5:
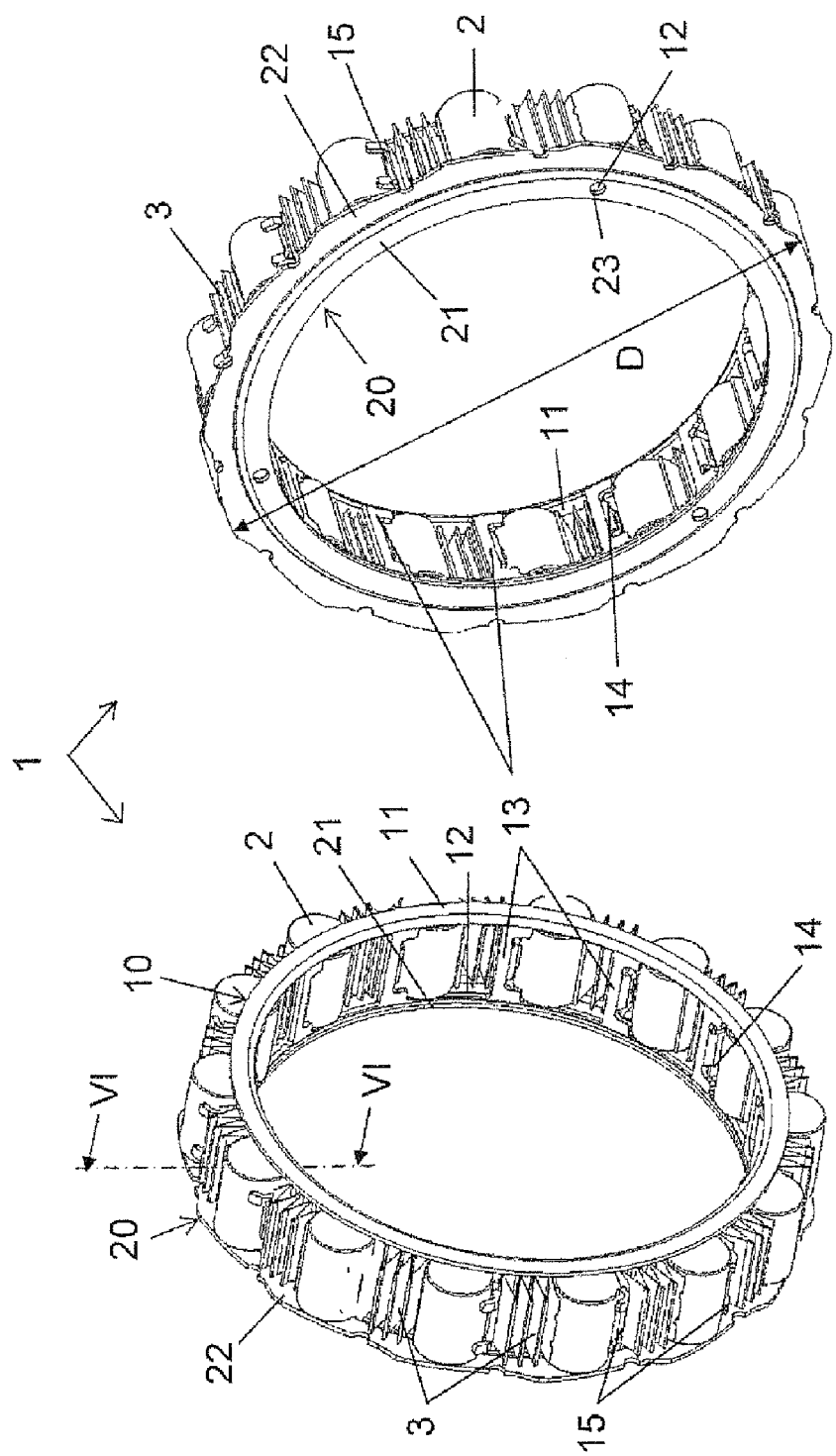
FIG. 4 shows a perspective illustration of the freewheel cage as per FIG. 1, but with clamp bodies and spring elements placed therein.
FIG. 5 shows a perspective illustration of the freewheel cage as per FIG. 4, but from its other end side.

Reference is now made to FIGS. 4 and 5. Said Figures show the freewheel cage 1 according to the invention having roller-shaped clamp bodies 2 placed into the intermediate spaces 14. Concertina-like or bellows-like spring elements 3 are also placed between the retaining elements 15, in such a way that always one clamp body 2 and one spring element 3 are arranged in a paired fashion between the retaining elements 15. The spring elements 3 press the clamp bodies 2 tangentially against the retaining elements 15.

FIG. 5 likewise shows a perspective illustration of the freewheel cage 1, but with the viewing direction aimed at the annular component 20. Through the openings 23 in the section 21, it is possible to see the second edge disk 12 which is fitted into the first section 21. It can also be seen from FIG. 5 that the annular component 20 has, at least in regions, a radial maximum outer diameter D which projects beyond the clamp bodies 2 which have been placed therein.

Figure 7:
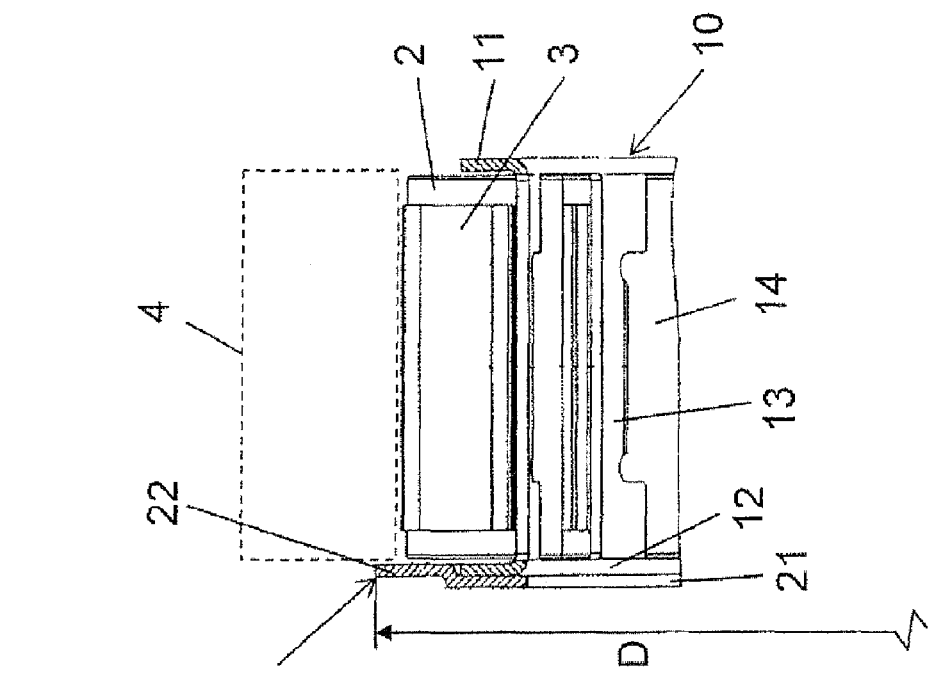
FIG. 7 shows an axial section through the freewheel cage corresponding to the section view VII-VII in FIG. 6.
Figure 6:
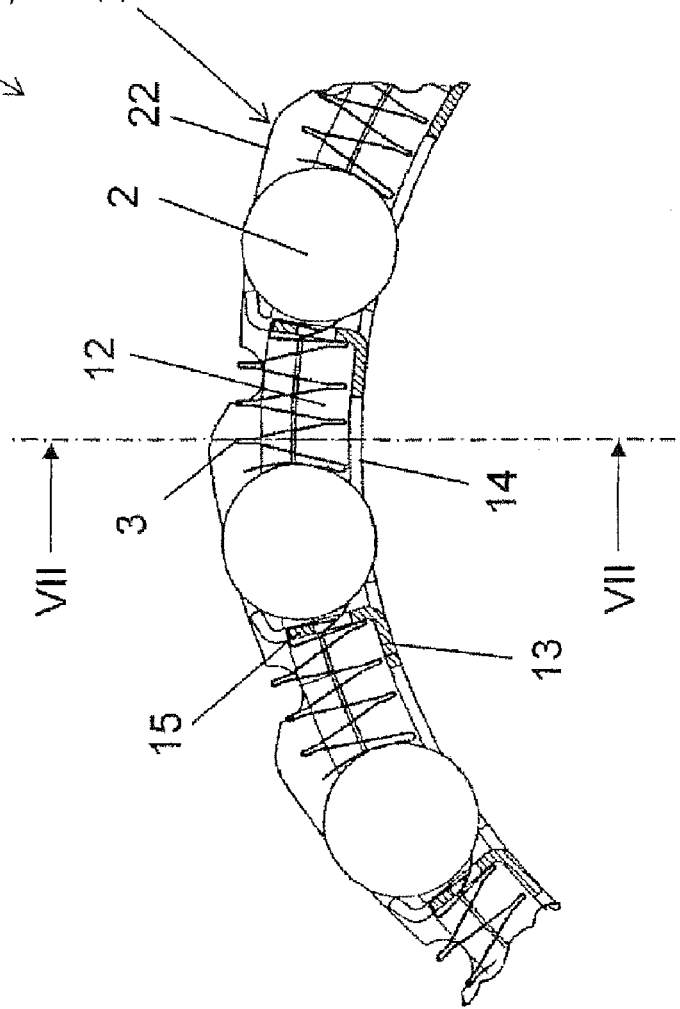
FIG. 6 shows a radial section through the freewheel cage corresponding to the section view VI-VI in FIG. 4, with only a part of the freewheel cage being illustrated.

FIG. 6 shows particularly clearly how the clamp bodies 2 are pressed by the spring elements 3 against the retaining elements 15. FIG. 7 clearly shows how the annular component 20 is connected to the basic body 10. It is possible to see the first radially aligned section 21 and the second radially aligned section 22 of the annular component 20, with the section 22 being formed so as to be offset axially inward, that is to say in the direction of the clamp bodies 2, in relation to the section 21. As a result of said axial offset, the second edge disk 12 can be fitted particularly effectively with its axially outer end surface into an axially inner surface of the section 21 of the annular component 20. Here, the axial offset provides the second edge disk 12 with a radial seat over its entire circumference.

It can also be seen in FIG. 6 that the maximum outer diameter D of the annular component 20 projects beyond the radial position of the clamp bodies 2. The resulting free axially inner end surface of the section 22 can therefore serve in a very effective manner for connection to an outer ring 4 (illustrated by dashed lines) of a freewheel. It can also be seen that the axially inner or end surfaces, respectively, of the section 22 and of the edge disk 12 are approximately in flush alignment with one another.

Figures 8, 9:
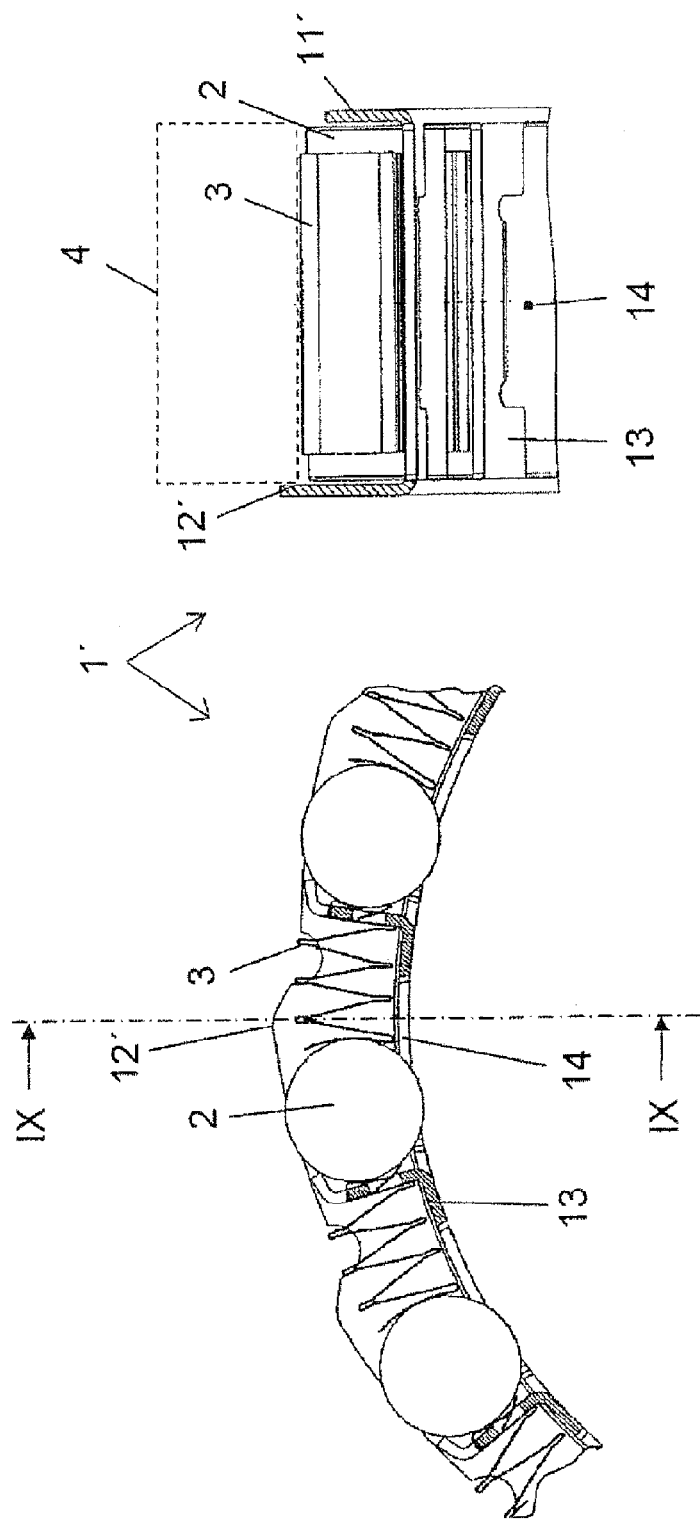
FIG. 8 shows a radial section through a freewheel cage known from the series production of the applicant, in a similar illustration to FIG. 6.
FIG. 9 shows an axial section through the known freewheel cage corresponding to the section view IX-IX in FIG. 8.

Finally, FIGS. 8 and 9 show a freewheel cage 1' known from the product catalog of the applicant, with said Figures corresponding to those of FIGS. 6 and 7. Identical components which have already been introduced are denoted by the same reference symbols. It can be seen in particular in FIG. 9 that the freewheel cage 1' has a first edge disk 11' and a second edge disk 12' which deviate from one another in terms of their radial extent (in contrast to the radial extent of the edge disks 11 and 12 according to the invention, compare FIG. 7). The edge disk 12' projects radially beyond the clamp bodies 2 and serves for fastening the freewheel cage 1' to the outer ring 4 (likewise indicated by dashed lines) of a freewheel. Therefore, in the freewheel cage 1' according to the prior art, the edge disk 12' in effect performs a dual function; as already described in the introduction, however, this increases the production expenditure and therefore the costs involved in the production of the freewheel cage 1'.

LIST OF REFERENCE SYMBOLS 1, 1' Freewheel cage
10 Basic body of freewheel cage
11, 11' First edge disk
12, 12' Second edge disk
13 Connecting pieces
14 Intermediate spaces
15 Retaining elements
2 Clamp bodies
20 Annular component
21 First radially aligned section of component 20
22 Second radially aligned section of component 20
23 Openings in section 21
24 Recesses in section 22
3 Spring elements
D Maximum diameter of the component 20

The invention claimed is:

1. A freewheel cage, comprising:
   a basic body having two annular, substantially radially extending edge disks being connected to one another by a plurality of axially running connecting pieces, which are adjacent to one another in a circumferential direction forming intermediate spaces for at least partially holding clamp bodies; and
   at least one means for fastening the basic body to a freewheel,
   wherein the means is at least one annular component connected to at least one of the edge disks, and
   wherein the annular component has, in an axial cross-section, at least one first radially aligned section and one second radially aligned section, the first radially aligned section and the second radially aligned section being offset axially with respect to one another.

2. The freewheel cage of claim 1, wherein the annular component is connected to an end side of one of the edge disks.

3. The freewheel cage of claim 1, wherein the annular component is welded, adhesively bonded, riveted or screwed to one of the edge disks.

4. The freewheel cage of claim 1, wherein the first radially aligned section is at least partially connected to one of the edge disks, and the second radially aligned section projects at least in regions radially beyond the clamp bodies placed in the basic body.

5. The freewheel cage of claim 1, wherein the second radially aligned section is arranged with its axially inner end surface approximately in flush alignment with an axially inner end surface of one of the edge disks.

6. The freewheel cage of claim 1, wherein the annular component has an outer diameter which is at least partially dimensioned such that the annular component is fastened to an end side of a freewheel outer ring.

* * * * *